(12) United States Patent
Barinberg et al.

(10) Patent No.: US 12,671,357 B2
(45) Date of Patent: Jun. 30, 2026

(54) CONTROL OF AN ELECTRIC MACHINE WITH TWO SEPARATE WINDING SYSTEMS, AND A CORRESPONDING CONTROL SYSTEM AND OPERATION OF AN ACTUATOR OF A STEER-BY-WIRE-SYSTEM

(71) Applicant: Schaeffler Technologies AG & Co. KG, Herzogenaurach (DE)

(72) Inventors: Viktor Barinberg, Nuremberg (DE); Sebastian Ariel Nani, Estenfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 211 days.

(21) Appl. No.: 18/712,301

(22) PCT Filed: Nov. 24, 2022

(86) PCT No.: PCT/DE2022/100879
§ 371 (c)(1),
(2) Date: May 22, 2024

(87) PCT Pub. No.: WO2023/098941
PCT Pub. Date: Jun. 8, 2023

(65) Prior Publication Data
US 2024/0396485 A1 Nov. 28, 2024

(30) Foreign Application Priority Data

Nov. 30, 2021 (DE) ..................... 10 2021 131 331.7

(51) Int. Cl.
*H02K 11/27* (2016.01)
*H02P 25/22* (2006.01)
(52) U.S. Cl.
CPC .......... *H02P 25/22* (2013.01); *H02P 2207/05* (2013.01)

(58) Field of Classification Search
CPC .. H02P 25/22; H02P 2207/05; H02P 21/0003; H02P 25/03
See application file for complete search history.

(56) References Cited

U.S. PATENT DOCUMENTS

| | | | |
|---|---|---|---|
| 5,543,696 A | 8/1996 | Huggett et al. | |
| 6,784,632 B2 | 8/2004 | Tomita | |
| 2021/0276613 A1* | 9/2021 | Beres ..................... | B62D 5/046 |

FOREIGN PATENT DOCUMENTS

| | | |
|---|---|---|
| DE | 19904040 A1 | 8/2000 |
| DE | 60311391 T2 | 11/2007 |
| EP | 3709503 A1 | 9/2020 |

OTHER PUBLICATIONS

Author: Huang et al. Source: Shared Control of Highly Automated Vehicles Using Steer-by-Wire Systems, IEEE/CAA Journal of Automatica Sinica, vol. 6, No. 2 Date: Mar. 1, 2019.

* cited by examiner

*Primary Examiner* — Muhammad S Islam

(57) ABSTRACT

The disclosure relates to a method for controlling the position of a rotor of an electric machine, in particular a permanently-excited synchronous machine with two separate winding systems, and each of the winding systems is controlled by an independent cascade control assigned to the respective winding system. Each of the two cascade controls includes i) an inner current-control circuit which controls a current of the electric machine, ii) a central speed-control circuit which is superordinate to the inner current-control circuit and which controls a speed of the electric machine, and, iii) an outer position-control circuit which is superordinate to the central speed-control circuit and controls the position of the rotor of the electric machine. The speed-control circuit has a speed controller without an I-component, in particular a P-controller.

19 Claims, 2 Drawing Sheets

CONTROL OF AN ELECTRIC MACHINE WITH TWO SEPARATE WINDING SYSTEMS, AND A CORRESPONDING CONTROL SYSTEM AND OPERATION OF AN ACTUATOR OF A STEER-BY-WIRE-SYSTEM

CROSS-REFERENCE TO RELATED APPLICATIONS

This application is the U.S. National Phase of PCT Application No. PCT/DE2022/100879 filed on Nov. 24, 2022, which claims priority to DE 10 2021 131 331.7 filed on Nov. 30, 2021, the entire disclosures of which are incorporated by reference herein.

TECHNICAL FIELD

The disclosure relates to a method for controlling the position of a rotor of an electric machine with two separate winding systems. The disclosure further relates to a method for operating an actuator of a steer-by-wire system. The disclosure also relates to a control device for controlling the position of a rotor of an electric machine with two separate winding systems.

BACKGROUND

Electric machines with separate winding systems are typically used in applications that have particularly high requirements for operational safety and availability, such as steer-by-wire systems for motor vehicles. Such steer-by-wire systems are steering systems with an electric actuator to which steering commands are transmitted exclusively electronically.

For the control of electric machines with separate winding systems, the dissertation "J. W. Bennett. Fault Tolerant Electromechanical Actuators for Aircraft. PhD Thesis. Newcastle University, 2010" discloses controlling each of the winding systems by a cascade control assigned to the winding system. The cascade controls comprise an inner current-control circuit that controls a current of the electric machine, a central speed-control circuit that is superordinate to the inner current-control circuit and that controls a speed of the electric machine, and an outer position-control circuit that is superordinate to the central speed-control circuit and that controls the position of the rotor of the electric machine or the position of an actuator element coupled to the rotor.

In such an electric machine, in which the two winding systems drive the same mechanical axis, even a small deviation in the control behavior of the two cascade controls typically results in larger differences in the set currents and torques that act on the common axis. This can result in counteracting torques (so-called "torque fighting"), which negatively influences the stability of the control of the electric machine, such that the overall system is no longer functional. As a remedy, the above-mentioned dissertation suggests a continuous adjustment of the two cascade controls, in which the outputs of the controllers of the speed-control circuits are added. This sum is halved and fed to the current-control circuits of both cascade controls.

The solution proposed in the prior art can lead to a reduction in torque fighting, but requires continuous data exchange between the two cascade controls of the separate winding systems. However, this data exchange is inconsistent with the idea of providing separate winding systems in order to provide redundancy, for example in such a way that if one winding system fails, the other winding system can maintain operation of the electric machine, possibly with restrictions. In addition, data exchange leads to increased utilization of the control hardware used. The communication between the two cascade controls places high demands on the synchronization of the control algorithms.

SUMMARY

Against this background, the object is to enable greater availability of an electric machine with separate winding systems while at the same time reducing the utilization of the required control hardware.

The object is achieved by a method for controlling the position of a rotor of an electric machine, in particular a permanently-excited synchronous machine, with two separate winding systems, each of the winding systems being controlled by an independent cascade control assigned to the winding system, each of the two cascade controls includes:

an inner current-control circuit that controls a current of the electric machine, a central speed-control circuit which is superordinate to the inner current-control circuit and which controls a speed of the electric machine, and an outer position-control circuit which is superordinate to the central speed-control circuit and which controls the position of the rotor of the electric machine, and the speed-control circuit has a speed controller without an I-component, in particular a P-controller.

In the method according to the disclosure, data exchange between the two cascade controllers can be dispensed with since the speed controller has no I-component, i.e., an integrating behavior. It has been found that the I-components cause undesirable 'torque fighting' because they do not tolerate steady-state control deviations and always strive to regulate such control deviations to zero. The speed controller can be designed as a P-controller, i.e., as a controller with proportional behavior. A P-controller tolerates a certain control deviation between the setpoint and the actual value. Smaller asymmetries in the two cascade controls, for example differences between the speed feedback of both cascade controls, do not lead to unstable behavior. Unlike what is known in the prior art, the cascade controls are designed to be independent of one another. This makes it possible to continue to operate the electric machine with the remaining cascade controls if one of the cascade controls fails. In addition, the independent design of the cascade controls eliminates the effort required for communication between the two cascade controls, so the control hardware is relieved.

In the context of the present disclosure, the position of the rotor is preferably understood to mean an angular position of the rotor. The position or angular position of the rotor can, for example, be specified relative to a zero position of the rotor, for example by specifying an angle relative to the zero position.

The position of the rotor can depend on the position of an actuator element coupled to the rotor, for example via a transmission. In such an embodiment with an actuator element, the outer position-control circuit superordinate to the central speed-control circuit can control the position of the actuator element coupled to the rotor of the electric machine. In this case, the method according to the disclosure directly controls the position of the actuator element and indirectly controls the position of the rotor of the electric machine.

According to an example embodiment of the disclosure, a smoothed position setpoint is fed in each case to the outer position-control circuit and is determined according to a position setpoint in such a way that a time derivative of the smoothed position setpoint is smaller in magnitude than a time derivative of the position setpoint. For example, the smoothed position setpoint is determined in such a way that the first time derivative of the smoothed position setpoint is smaller in magnitude than a time derivative of the position setpoint. In this respect, the derivative of the position or angular position of the rotor can be limited, i.e., the speed or angular velocity of the rotor can be limited. This limitation can further improve the stability of the control. In addition, the smoothed position setpoint can be determined in such a way that the second time derivative of the smoothed position setpoint is smaller in magnitude than a time derivative of the position setpoint. In this respect, an acceleration relevant to the position, for example the angular acceleration, can be limited, thereby further improving the stability and quality of the control.

According to an example embodiment of the disclosure, the position setpoint is specified as a position command and, according to the position command, a trajectory consisting of a sequence of multiple smoothed position setpoints is determined. The control system can contain a unit for generating a trajectory from the position command. Such a unit can be called a trajectory planner.

According to an example embodiment of the disclosure, the trajectory comprises an acceleration section and a deceleration section following the acceleration section. In the acceleration section, the second time derivative of the smoothed position setpoint is positive; in the deceleration section, the second time derivative of the smoothed position setpoint is negative. Optionally, between the acceleration section and the deceleration section there is a section with a constant speed, in which the first time derivative of the smoothed position setpoint is constant and the second time derivative is equal to zero.

According to an example embodiment of the disclosure, a speed feedforward control value is fed to the central speed-control circuit and is determined according to a position setpoint. Such a feedforward control can enable high quality of speed control despite the absence of an I-component (integral component) in the speed controller. The speed feedforward control value can be determined, for example, in the same unit that generates the trajectory of the smoothed position setpoint. Owing to the speed feedforward control, the position error becomes approximately zero at a constant speed.

According to an example embodiment of the disclosure, a current feedforward control value or acceleration feedforward control value, which is determined according to a position setpoint, is fed to the inner current-control circuit. This feedforward control enables the quality of the current control to be achieved despite the absence of an I-component (integral component) in the superordinate speed controller. The acceleration feedforward control reduces the speed error during acceleration.

According to an example embodiment of the disclosure, the inner current-control circuit controls the current using vector control. Such a control can also be referred to as field-oriented control. The vector control uses a rotor-related space vector representation with two components: the d-component and the q-component. Here, the measured phase currents are transformed into the rotor-related space vector representation and fed as feedback to a closed control circuit for the d-component and the q-component.

According to an example embodiment of the disclosure, the outer position-control circuit has a position controller which is designed as a P-controller.

According to an example embodiment of the disclosure, an identical position setpoint is fed to the outer position-control circuits of both cascade controls.

The disclosure further relates to a method for operating an actuator of a steer-by-wire system, in particular a feedback actuator or a steering actuator, which comprises an electric machine, in particular a permanently-excited synchronous machine, with two separate winding systems, wherein one position of the rotor of the electric machine is adjusted according to a method described above.

The disclosure further relates to a control device for controlling the position of a rotor of an electric machine, in particular a permanently-excited synchronous machine, having two separate winding systems, wherein each of the winding systems is controllable by an independent cascade control assigned to the winding system, and each of the two cascade controls includes:

an inner current-control circuit for controlling a current of an electric machine, a central speed-control circuit, which is superordinate to the inner current-control circuit, for controlling a speed of the electric machine, and an outer position-control circuit, which is superordinate to the central speed-control circuit, for controlling the position of the rotor of the electric machine, and the speed-control circuit has a speed controller without an I-component, in particular a P-controller.

In the method for operating an actuator and the control device, the same advantages can be achieved that have already been explained in connection with the method for controlling the position of a rotor of an electric machine with two separate winding systems. The advantageous embodiments and features described in this context can also be used in the method for operating an actuator and the control device.

BRIEF DESCRIPTION OF THE DRAWINGS

Further details and advantages of the disclosure are explained below with reference to the exemplary embodiment shown in the drawings. In the drawings.

DETAILED DESCRIPTION

Figure 1:
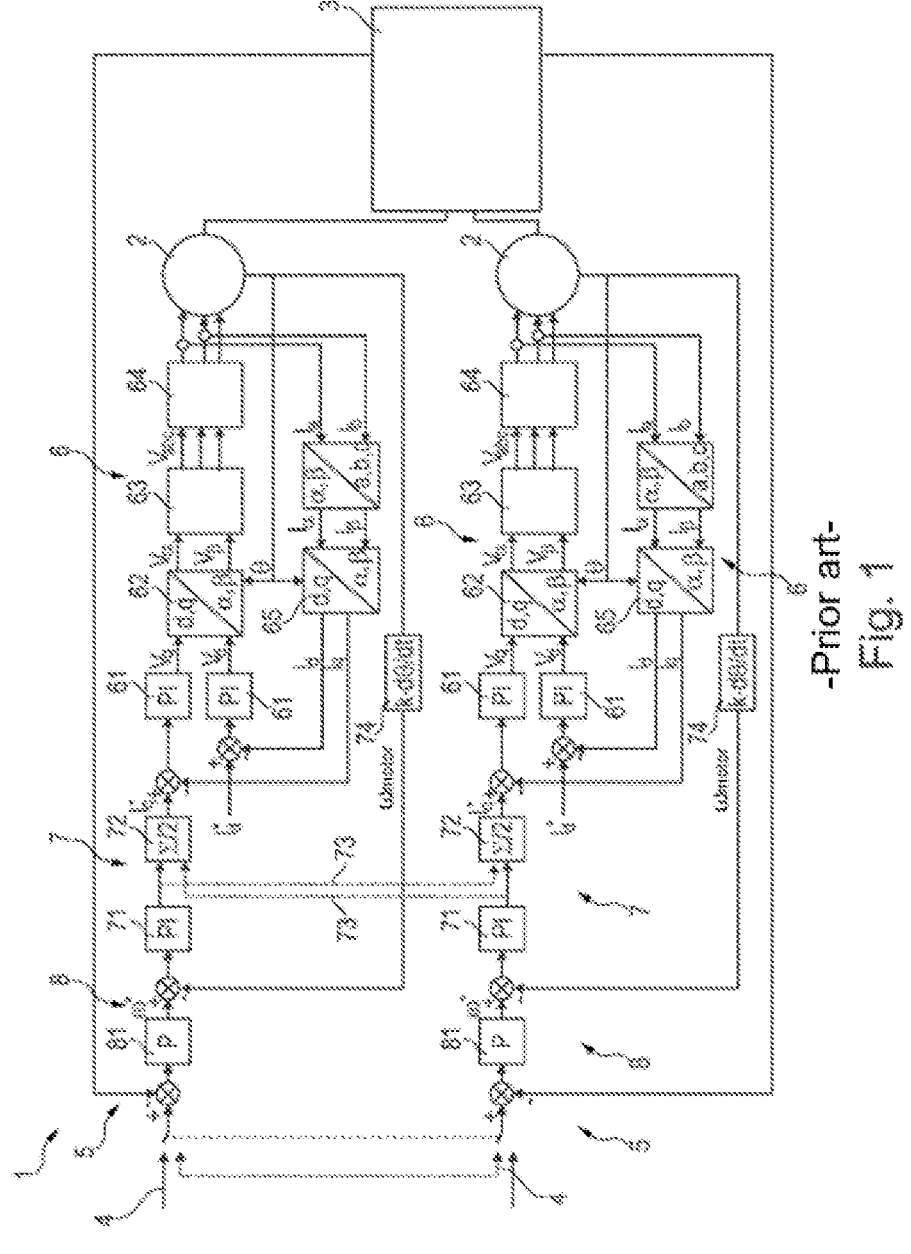
FIG. 1 shows a schematic representation of a control device for controlling the position of a rotor of an electric machine with two separate winding systems according to the prior art.

FIG. 1 shows a control device 1 for position control in an electric machine, for example a permanently-excited synchronous machine, which is designed in a conventional manner known in the prior art. The electric machine comprises two winding systems that are designed to be separate from one another, which is why the electric machine is shown in FIG. 1 as two separate sub-machines 2. Each of these sub-machines 2 comprises precisely one winding system, here a three-phase winding system. The sub-machines 2 act on a common shaft or a common rotor 3, the position or angular position of which is controlled.

For this purpose, the control device 1 is given a position setpoint 4, which is fed to two cascade controls 5. In the present case, the position setpoint 4 can be selected from two different position setpoints via a switch. Each of the cascade controls 5 is assigned to one of the two winding systems of the electric machine, i.e., to a sub-machine 2. The cascade controls 5 comprise a three-stage structure with an inner current-control circuit 6, a central speed-control circuit 7 and an outer position-control circuit 8.

The inner current-control circuit 6 controls the phase currents fed to the electric sub-machine 2 and thereby the torque of the sub-machine 2. In the present case, the inner current-control circuit 6 is designed in the manner of a vector control or field-oriented control. This vector control uses a rotor-related space vector representation with two components: the d-component and the q-component. Here, measured phase currents are transformed into the rotor-related space vector representation and fed as feedback to a closed control circuit for the d-component and the q-component. The inner current-control circuit 6 comprises a current controller 61 for the d-component and the q-component, which is designed as a PI controller. Voltages output by the current controllers 61 as space vector component $V_q$, $V_d$ are transformed using an inverse Clarke transformation 62. The output voltages $V_a$, $V_b$ of the inverse Clarke transformation 62 is fed to a control unit 63, which provides control signals $V_{a,b,c}$ according to a space vector-based pulse width modulation for a converter 64. The converter 64 is designed as a three-phase converter and controls the sub-machine 2.

Currents $I_a$, $I_b$ in the supply lines of the sub-machine 2 are measured via current sensors. The measured currents are transformed into a corresponding d-component and q-component for feedback to the current controller 61 using a Clarke transformation 65.

The central speed-control circuit 7 is superordinate to the inner current-control circuit 6 and controls the speed of the sub-machine 2. The speed-control circuit 7 comprises a speed controller 71 designed as a PI controller, i.e., a controller with a proportional and integral component. The outputs of these speed controllers 71 of the two cascade controllers 5 are added, divided by two and then fed to the current-control circuits 6 of the two cascade controllers 5 as a setpoint. For this purpose, the central speed-control circuit 7 comprises a summer 72 and corresponding data lines 73 between the two cascade controls 5. This data exchange between the two cascade controllers 5 ensures that the setpoints of the current-control circuits 6 are identical and that no 'torque fighting' occurs. In addition, an identical utilization of both sub-machines 2 is achieved. As feedback, the speed controller 71 is fed with an actual angular velocity, which is determined according to an actual position value by the time derivative 74.

The outer position-control circuit 8 is superordinate to the central speed-control circuit 7 and controls the position of the rotor 3 of the electric machine. For this purpose, the position-control circuit 6 comprises a position controller 81, which is designed as a P-controller and to which the position of the rotor is fed back.

Figure 2:
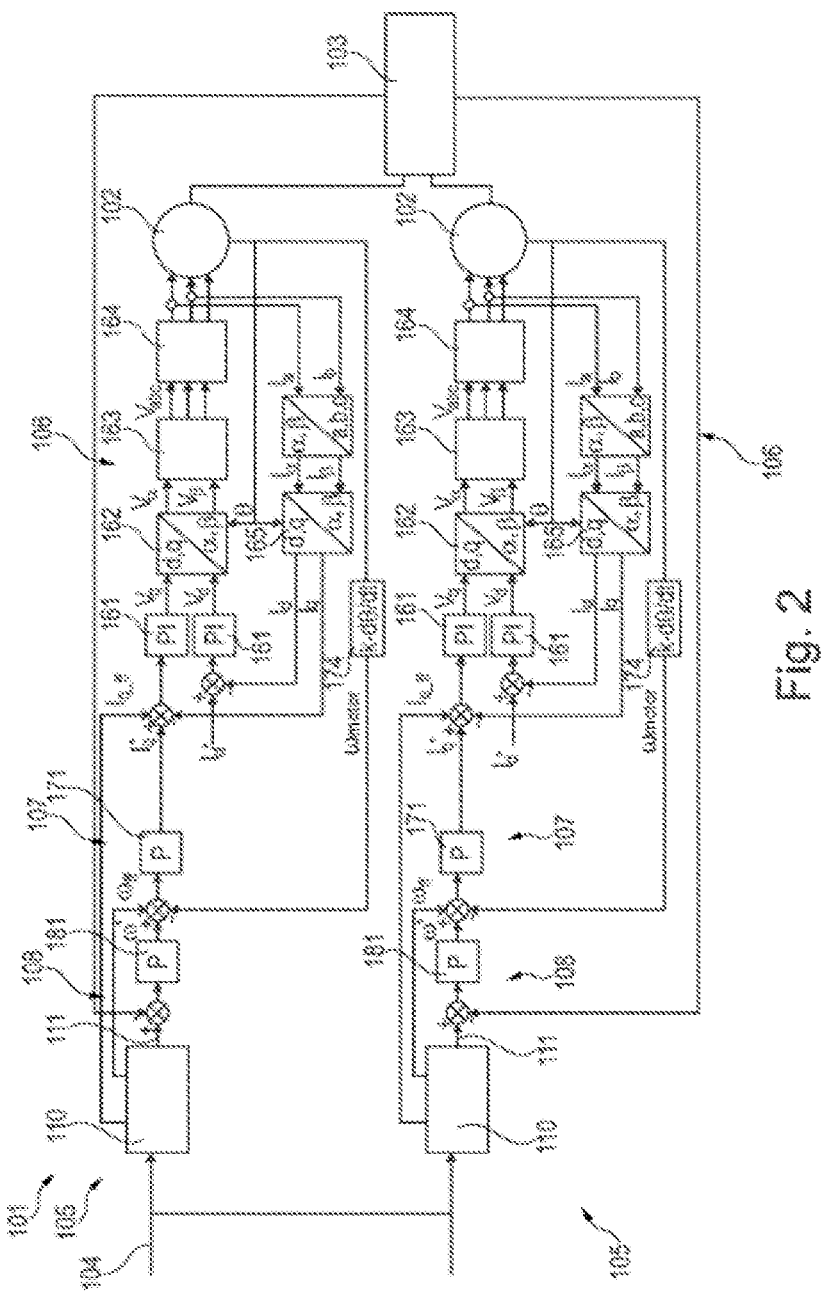
FIG. 2 shows a schematic representation of an exemplary embodiment of a control system according to the disclosure.

FIG. 2 shows a control device 101 for controlling the position of a rotor 103 of an electric machine with two separate winding systems according to an exemplary embodiment of the disclosure. The control device 101 according to the disclosure comprises multiple elements which fulfill the same function as corresponding elements of the control device 1 known from the prior art according to FIG. 1. These elements are each marked with a reference sign which is a number that is 100 higher than the number according to FIG. 1. For example, the current-control circuit 106 according to FIG. 2 corresponds to the current-control circuit 6 according to FIG. 1. For these elements, reference is therefore made to the description for FIG. 1.

In contrast to the control device 1 shown in FIG. 1, two independent cascade controls 105 are provided in this control device 101. This means that there is no data exchange between the two cascade controls 105. These cascade controls 105 are fed with an identical position setpoint 104, on the basis of which the cascade controls 105 control the respective winding systems assigned to the cascade control 105—i.e., sub-machines 102—completely independently of one another. The torques specified by the cascade controls 105 add up on the common axis of the electric machine without any disruptive 'torque fighting' being observed.

This decoupling of the two cascade controls 105 is possible because the speed-control circuit 107 has a speed controller 171 without an I-component (integral component), here a P-controller. The P-controller tolerates a certain control deviation between the setpoint and the actual value. Smaller asymmetries in the two cascade controls 105, for example differences between the speed feedback of the two cascade controls 105, therefore do not lead to unstable behavior.

The cascade controls 105 are fed with an identical position setpoint 104, which in the present example is a position command, i.e., an indication of a target position or angular position of the rotor 103. By means of a unit 110 for planning a trajectory, a smoothed position setpoint 111 is determined according to this position setpoint 104 and fed to the outer position-control circuit 108. The smoothed position setpoint 111 is determined in such a way that the first and second time derivatives of the smoothed position setpoint 111 are smaller in magnitude than a first and second time derivative, respectively, of the position setpoint 104. The unit 110 for planning a trajectory determines, on the basis of a position command, a trajectory consisting of a sequence of multiple smoothed position setpoints 111. This trajectory includes an acceleration section and a deceleration section following the acceleration section. Optionally, a section with a constant speed can be present between the acceleration section and the deceleration section, in which a time derivative of the smoothed position setpoint 111 is constant and the second time derivative is equal to zero.

The unit 110 for planning the trajectory additionally determines signals for a speed feedforward control and an acceleration feedforward control. The signal for the speed feedforward control is also referred to as the speed feedforward control value $\omega_{ff}$ and is fed to the central speed-control circuit 107. The signal for the acceleration feedforward control is also referred to as the current feedforward control value $I_{ff}$ or acceleration feedforward control value and is fed to the inner current-control circuit 106. The feedforward control improves the control behavior of the control device 101.

Deviating from the exemplary embodiment of a control device 101 explained above, the rotor 103 of the electric machine can be coupled to an actuator element, for example via a transmission. In such an embodiment with an actuator element, the outer position-control circuit 108, which is superordinate to the central speed-control circuit 107, can control the position of the actuator element coupled to the rotor 103 of the electric machine. In this case, the method according to the disclosure directly controls the position of the actuator element and indirectly controls the position of the rotor 103 of the electric machine.

The control device 101 explained above and the method implemented therewith for controlling the position of the rotor 103 of the electric machine with two separate winding systems can be used to operate an actuator of a steer-by-wire system. In particular, a feedback actuator or a steering actuator of such a steer-by-wire system can be controlled. The disclosure enables greater availability of the electric machine with separate winding systems while utilization of the required control hardware is simultaneously reduced.

LIST OF REFERENCE SYMBOLS 1, 101 Control device
2, 102 Sub-machine
3, 130 Rotor
4, 104 Position-setpoint
5, 105 Cascade control
6, 106 Inner current-control circuit
7, 107 Central speed-control circuit
8, 108 Outer position-control circuit
110 Unit for planning a trajectory
111 Smoothed position setpoint
61, 161 Current controller
62, 162 Inverse Clarke transformation
63, 163 Control unit
64, 164 Converter
65, 165 Clarke transformation
71, 171 Speed controller
72 Summer
73 Data lines
74, 174 Derivative of the actual position value
81, 181 Position controller

The invention claimed is:

1. A control device for controlling a position of a rotor of an electric permanently-excited synchronous machine with two separate winding systems, each of the two separate winding systems controlled by a first independent cascade control and a second independent cascade control, each of the first independent cascade control and the second independent cascade control comprising:
   an inner current-control circuit configured to control a current of the electric permanently-excited synchronous machine,
   a central speed-control circuit superordinate to the inner current-control circuit, the central speed-control circuit configured to control a speed of the electric permanently-excited synchronous machine, and
   an outer position-control circuit superordinate to the central speed-control circuit, the outer position-control circuit configured to control the position of the rotor of the electric permanently-excited synchronous machine, and
   the central speed-control circuit has a proportional speed controller (171) without an integral component.

2. The control device according to claim 1, wherein a smoothed position setpoint is supplied to the outer position-control circuit and is determined according to a position setpoint such that a time derivative of the smoothed position setpoint (111) is smaller in magnitude than a time derivative of the position setpoint.

3. The control device according to claim 2, wherein the position setpoint is specified as a position command and, depending on the position command, a trajectory comprising of a sequence of multiple smoothed position setpoints is determined.

4. The control device according to claim 3, wherein the trajectory comprises an acceleration section and a braking section following the acceleration section.

5. The method control device according to any one of the preceding claim 4, wherein a speed feedforward control value is supplied to the central speed-control circuit and is determined according to the position setpoint.

6. The control device according to claim 5, wherein a current feedforward control value or acceleration feedforward control value is supplied to the inner current-control circuit and is determined according to the position setpoint.

7. The method control device according to any one of the preceding claim 6, wherein the inner current-control circuit controls the current via vector control.

8. The control device according to claim 7, wherein the outer position-control circuit has a position controller configured as a proportional controller.

9. The control device according to claim 8, wherein an identical position setpoint is supplied to the outer position-control circuits of both cascade controls.

10. A control device for controlling a position of a rotor of an electric machine with two separate winding systems, each of the two separate winding systems controlled by a first independent cascade control and a second independent cascade control, each of the first independent cascade control and the second independent cascade control comprising:
   an inner current-control circuit configured to control a current in the electric machine,
   a central speed-control circuit superordinate to the inner current-control circuit, the central speed-control circuit configured for controlling a speed of the electric machine, and
   an outer position-control circuit, superordinate to the central speed- control circuit (107), the outer position-control circuit configured to control the position of the rotor of the electric machine,
   wherein the central speed-control circuit has a proportional speed controller without an integral component.

11. The control device of claim 10, wherein a smoothed position setpoint is supplied to the outer position-control circuit and is determined according to a position setpoint such that a time derivative of the smoothed position setpoint is smaller in magnitude than a time derivative of the position setpoint.

12. The control device according to claim 10, wherein the inner current-control circuit controls the current via vector control.

13. The control device according to claim 10, wherein the outer position-control circuit has a position controller configured as a proportional controller.

14. The control device according to claim 10, wherein an identical position setpoint is supplied to the outer position-control circuits of both cascade controls.

15. The control device according to claim 11, wherein the position setpoint is specified as a position command and, depending on the position command, a trajectory comprising of a sequence of multiple smoothed position setpoints is determined.

16. The control device according to claim 11, wherein a speed feedforward control value is supplied to the central speed-control circuit and is determined according to the position setpoint.

17. The control device according to claim 11, wherein a current feedforward control value or acceleration feedforward control value is supplied to the inner current-control circuit and is determined according to the position setpoint.

18. The control device according to claim 15, wherein the trajectory comprises an acceleration section and a braking section following the acceleration section.

19. A method for controlling a position of a rotor of an electric machine, comprising:
   providing:

two separate winding systems configured to control the position of the rotor, each of the two separate winding systems controlled by a first independent cascade control and a second independent cascade control, each of the first independent cascade control and the second independent cascade control comprising: i) an inner current-control circuit configured to control a current in the electric machine, ii) a central speed-control circuit superordinate to the inner current-control circuit, the central speed-control circuit having a proportional speed controller, without an integral component, configured for controlling a speed of the electric machine, and iii) an outer position-control circuit superordinate to the central speed-control circuit, the outer position-control circuit configured to control the position of the rotor of the electric machine, and supplying an identical position setpoint to the outer position-control circuits of both cascade controls.

\* \* \* \* \*